United States Patent Office 2,916,469
Patented Dec. 8, 1959

2,916,469

ADHESIVE COMPOSITION PREPARED BY POLYMERIZING A MIXTURE OF METHYL METHACRYLATE AND A TETRAPOLYMER

Joginder Lal, Philadelphia, Pa., assignor to H. D. Justi & Son, Inc., Philadelphia, Pa., a corporation of Pennsylvania No Drawing. Application May 26, 1954
Serial No. 432,603

4 Claims. (Cl. 260—41)

This invention relates to the preparation of adhesive polymeric materials by the copolymerization of four different monomers. This invention also concerns the various uses of these adhesive-copolymer materials.

The adhesive properties of many polymeric materials decrease considerably when subjected to the action of water. One of the causes for loss of adhesion is the absorption of water by the adhesive material. When adhesion is primarily due to mechanical bonding instead of chemical bonding, the volumetric expansion of the adhesive layer following the uptake of water results in the loss of mechanical bonding. Even where chemical bonding is involved, the absorbed water tends to collect at the interface or to hydrate polar groups, thereby reducing the adhesion.

I have discovered that if water-repellent groups are present in the polymeric chain, the adhesive character of the polymeric material is retained over a longer period when subjected to the action of the water. This water-repellent character of the adhesive material may be achieved by incorporating in the polymer chain a suitable water-repellent monomer, or a monomer which tends to crystallize in the polymerized condition, or a combination of both.

The adhesive copolymer of the invention is obtained by copolymerizing in the presence of a free radical polymerization catalyst (1) from 0.1–15% methacrylic acid, (2) from 5–30% styrene, (3) 5–40% acrylonitrile, and (4) 20–80% methyl methacrylate, mixing methyl methacrylate with the copolymer and polymerizing the mixture.

The polymerizable acid monomer in the tetrapolymer, e.g., methacrylic acid, is present in an amount with the other three monomers whereby there is substantially no loss of adhesion due to absorption of water by the adhesive tetrapolymer in admixture with methyl methacrylate.

Styrene is present in the tetrapolymer in an amount less than that which will impair the adhesive properties of the tetrapolymer and sufficient to impart water-repellent characteristics to the tetrapolymer adhesive composition. Acrylonitrile serves as a crystalline monomer which enhances the water-repellent adhesive properties of the tetrapolymer composition, the latter property being impaired in the absence of acrylonitrile and in the presence of styrene.

It is important to observe certain proportions of the four components in the monomer mixture from which the adhesive copolymer is obtained. The tendency to attract water due to the presence of acid monomer, e.g., methacrylic acid needs to be counteracted by the water-repellent character imparted to the tetra-copolymer due to the presence of the water repellent and the crystallizable monomers, e.g., styrene and acrylonitrile, respectively.

Bearing this requirement in mind, good adhesive properties of the tetra-copolymers are obtained by the polymerization of a monomer mixture comprising (1) 0.1–15 percent of methacrylic acid as the polymerizable acid monomer, (2) 5–30 percent of styrene as the polymerizable non-polar monomer, (3) 5–40 percent of acrylonitrile as the crystallizable monomer, and (4) 20–80 percent of methyl methacrylate as the polymerizable compatibilizing monomer.

Any suitable method may be used in preparing the copolymer of the four monomers. For example, the monomers may be mixed and the resulting mixture polymerized in the presence or absence of a solvent, or an emulsifying agent, or of a dispersion medium for the monomers, by the use of heat, light, gamma rays, or heat and light in the presence or absence of a polymerization catalyst, at atmospheric, subatmospheric or superatmospheric pressure.

Suitable catalysts are the free radical polymerization catalyst such as peroxides, e.g., benzoyl peroxide, phthaloyl peroxide, substituted benzoyl peroxides, acetyl peroxide, caproyl peroxide, lauroyl peroxide, cinnamoyl peroxide, acetyl benzoyl peroxide, methyl ethyl ketone peroxide, sodium peroxide, hydrogen peroxide, di-tert. butyl peroxide, tetraline peroxide, urea peroxide, etc., the hydroperoxides, e.g. cumene hydroperoxide, p-menthane hydroperoxide, di-isopropyl-benzene hydroperoxide, tert. butyl hydroperoxide, methyl ethyl ketone hydroperoxide, 1-hydroxycyclohexyl hydroperoxide-1 etc., azo compounds such as 2,2'-azo-bis-isobutronitrile, 2,2'-azo-bis-isovaleronitriles, etc., the per compounds, e.g. ammonium persulfate, sodium perborate, sodium perchlorate, potassium persulfate, etc., ozone, ozonides, etc., Lewis-acid type catalysts e.g., boron trifluoride, aluminum chloride, stannic chloride, etc., metal compounds of unsaturated acids, such as cobalt and manganese salts of linoleic acid, maleic acid, etc. The catalysts may be used alone or in admixture with one another. Benzoyl peroxide is the preferred catalyst. Any suitable amount of the catalyst may be used, but in general the catalyst concentration that gives satisfactory results may be within the range of 0.1 and 2.0 percent by weight of the entire polymerizable mass.

The thermoplastic adhesive tetra-polymer may be used for cementing like surfaces, such as metal surfaces, e.g. gold, stainless steel, porcelain, ivory, polymethyl methacrylate, polystyrene, etc., or it may be used for cementing dissimilar surfaces such as porcelain to polymethyl methacrylate, ivory to polystyrene, gold to polymethyl methacrylate, copper to glass, aluminum to glass, etc. Of particular significance is the fact that very few materials will adhere to the components of living and extracted teeth. The adhesive copolymer, however, adheres to the components of living and extracted teeth very well.

Consequently, the adhesive copolymer may be used with great advantage in the compositions of dental products in which adhesion is desirable, such as resin cements, resin filling materials, etc., or other dental products where the adhesive qualities of the tetra-copolymer will show up with advantage when used either alone or in conjunction with other polymers, or copolymers.

The adhesive copolymer may also contain an inert material such as diatomaceous earth, alumina, silica, silicate, powdered glass, carbonate, phosphates, coke, pigments, etc.

It is possible to use the adhesive copolymer in a variety of ways, e.g. one may mix the adhesive copolymer with a suitable monomer or mixture of monomers selected from common monomers, such as the various esters of methacrylic acid, acrylic acid, crotonic acid, alpha-chloroacrylic acid, alpha-bromoacrylic acid, etc., and an alcohol, e.g. methyl methacrylate, ethyl methacrylate, methyl acrylate, ethyl acrylate, methyl crotonate, methyl alpha-chloroacrylate, methyl alpha-bromoacrylate, methyl alpha-cyanoacrylate, etc., other monomers such as acrylonitrile, methacrylonitrile, styrene, various substituted styrenes, vinyl acetate, vinyl benzoate or other vinyl esters, etc. In a preferred form, the adhesive tetrapolymer is dissolved in methyl methacrylate monomer containing benzoyl peroxide and N,N-dimethyl-para-toluidine to provide a mixture polymerizing at room temperature and particularly useful for adhesion to surfaces of gold, ivory, stainless steel, enamel, dentine and porcelain. One may bring about the polymerization of the resulting adhesive mass by the application of heat, light or heat and light in the presence or absence of polymerization catalyst at subatmospheric, atmospheric or superatmospheric pressure. One may choose to bring about the polymerization of the adhesive mass comprising the adhesive copolymer and the monomer, or mixture of monomers, by employing a catalyst-promoter system which enables the polymerization to proceed at room temperature and polymerizes the adhesive mass in a much shorter time. A number of nitrogenous compounds, e.g. amines, especially aromatic, heterocyclic and aliphatic tertiary amines, azo compounds, etc., aromatic sulfinic acids, certain sulfites such as dibutyl sulfite, etc., long chain aliphatic mercaptans, e.g. dodecyl mercaptan, etc., are capable of promoting the action of catalysts such as peroxides, persulfates, etc. The polymerization of the polymerizable mass proceeds at room temperature, with the evolution of heat. The polymerization conditions can be modified.

Another method of using the adhesive tetra-copolymer consists in mixing it with an unsaturated styrenated polyester and polymerizing the final mass by the conventional methods of curing the polyester. This is found to be of particular value in glass fibre-polyester lamination.

In any of the above methods for using the adhesive tetra-copolymer, the polymerizable mass may also contain, if desired, suitable antibacterial materials which do not inhibit polymerization.

One may also use the adhesive copolymer by dissolving it in a suitable volatile organic solvent such as acetone, ethylene dichloride, benzene, toluene, etc., and applying to surfaces which are to be adhered together. Any suitable antibacterial substance may also be added to the solution of the adhesive copolymer in the solvent.

The following examples are illustrative of my invention.

Example 1

Five parts of glacial methacrylic acid, twenty parts of styrene, fifteen parts of acrylonitrile and sixty parts of methyl methacrylate were mixed and one part of benzoyl peroxide was dissolved in it. The monomer mixture was added to three hundred parts of water and one part of sodium cellulose sulfate contained in a polymerization kettle which was vigorously agitated with a stirrer. The temperature of the entire mass was maintained at about 60° C. and the polymerization allowed to proceed for about five hours. The polymerized material was obtained in the form of very small pearls. The copolymer was filtered and washed with water. The dry copolymer weighed about sixty parts.

Example 2

Three parts of methacrylic acid, twenty parts of styrene, twenty parts of acrylonitrile and fifty-seven parts of methyl methacrylate were mixed and one part of p-chlorobenzoyl peroxide was dissolved in it. The monomer mixture was placed in a strong-walled Pyrex tube which was then carefully sealed. The tube was encased in a steel safety tube and then placed in an oven maintained at 60° C. After 4 hours, the steel safety tube was taken out of the oven. When the glass tube has cooled down, it was chilled in powdered Dry Ice for thirty minutes and the seal broken carefully. The contents were dissolved in 200 ml. of acetone. The solution was poured dropwise into one litre of methanol which was continuously stirred. The white precipitate of the copolymer was separated and dried in vacuum to give thirty parts of the material.

Example 3

Ten grams of the polymer powder obtained in Example 1 was thoroughly mixed with 0.2 gram of benzoyl peroxide. Two grams of this powder was mixed with 2 ml. of methyl methacrylate containing 0.5 percent of N,N-dimethyl-p-toluidine. A small amount of the adhesive mix was placed between the parallel faces of two cylinders of casting gold, having an area of cross-section of 0.1 sq. inch. After a few minutes the adhesive mass polymerized. The gold cylinders thus cemented were placed in water for 24 hours. On examination the cylinders were still found to be held together very strongly by the cementing mass and required a tensile force of about sixty pounds to pull them apart.

When the above test was repeated, using ivory cylinders having an area of cross-section 0.1 sq. inch, a tensile force of more than a hundred pounds was needed to pull them apart. Similar values were observed for stainless steel, copper, etc.

The experiment was repeated using human teeth, the surface of the teeth having been made plane. After immersion in water for 24 hours, the teeth were still held together very strongly.

Example 4

Ten grams of the copolymer obtained in Example 2 was dissolved in 100 ml. of ethylene dichloride. The solution was applied to the parallel faces of two porcelain cylinders. After a few minutes, the two faces were brought together and allowed to remain undisturbed for a few hours. On examination, the porcelain cylinders were found to be tenaciously held together.

Example 5

Resins, in general, are inert. Bacteria and fungi can grow on and around the resinous material. In the airplane industry, particularly in tropical climates, fungi grow on windscreens and reduce visibility.

The adhesive copolymer can be used for cementing plastic windscreens in the airplane industry in a variety of ways. If suitable antibacterial materials are added to the adhesive copolymer, the bacteria and fungi growth can be controlled.

The following example is an illustration of the effectiveness of antibacterial material in the adhesive copolymer.

Ten grams of polymer powder obtained in Example 1 was thoroughly mixed with 0.5 gram of sodium pentachlorophenate and 0.2 gram of benzoyl peroxide. The mixture was treated with 5 ml. of methyl methacrylate containing 0.5 percent N,N-dimethyl-p-toluidine. The resulting mass of dough-like consistency was placed in a mold and polymerized in about 10 minutes. The polymerized material was cut into small samples 1.3 cm. x 1.3 cm. These samples were studied for their antibacterial action by placing them in blood agar base to which 1 ml. of undiluted human saliva was added. Zones of inhibition about 2 cm. wide were observed around the sample after 48 hours both under aerobic and anaerobic conditions.

Example 6

Direct resin filling materials are being commonly used for filling the cavities of the natural teeth. During polymerization, shrinkage amounting to about 6–8 percent by volume takes place. Since most of these resin filling materials adhere poorly to the walls of the cavity, the polymerization shrinkage creates a crevice between the cavity walls and the resin filling and leads to the lodgement of debris and bacteria in the crevice.

The adhesive copolymer on account of its adhesion to tooth structure can be used with advantage in the resin filling materials. Furthermore, if a suitable antibacterial compound, which does not inhibit the polymerization, is incorporated in resin filling material, the growth of bacteria normally present in saliva and the oral cavity can be controlled.

Thus, when the dough-like mass as in Example 5 containing barium 2,4,5-tribromophenate instead of sodium pentachlorophenate as antibacterial material was used for filling cavities, the antibacterial properties of the resin filling prevented the growth of bacteria under the plastic mass in the tooth.

Similar results were obtained when aluminum p-methoxyphenate was used as antibacterial material.

Since certain changes may be made in the above masses and different embodiments of the invention could be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention which, as a matter of language, might be said to fall thereunder.

I claim:

1. An adhesive composition resistant to water and adapted to adhere to metal, glass, porcelain, tooth ivory, polymethyl methacrylates and polystyrene surfaces, prepared by mixing and polymerizing methyl methacrylate and a copolymer of a mixture consisting of (1) from 0.1–15% methacrylic acid, (2) from 5–30% styrene, (3) 5–40% acrylonitrile, and (4) the remainder being a compatibilizing methacrylate ester selected from the group consisting of methyl methacrylate, ethyl methacrylate, propyl methacrylate, isopropyl methacrylate, butyl methacrylate and isobutyl methacrylate, said polymerizing being effected in the presence of benzoyl peroxide and N,N-dimethyl-p-toluidine.

2. An adhesive polymer composition resistant to water and adapted to adhere to metal, glass, porcelain, tooth ivory, polymethyl methacrylate and polystyrene surfaces prepared by mixing and polymerizing methyl methacrylate and a copolymer consisting of a mixture of (1) from about 3 to about 5% methacrylic acid, (2) about 20% of styrene, (3) from about 15 to about 20% of acrylonitrile, and (4) from about 57 to about 60% of methyl methacrylate, said polymerization being effected in the presence of benzoyl peroxide and N,N-dimethyl-p-toluidine.

3. An adhesive composition as claimed in claim 2 wherein the ratio of weight of said copolymer to the volume of said methyl methacrylate expressed in grams to milliliters varies from about 1 to 1 to about 2 to 1.

4. An adhesive composition as claimed in claim 3 which contains an inert filler selected from the group consisting of silica, powdered glass and alumina.

References Cited in the file of this patent

UNITED STATES PATENTS

| 1,933,052 | Fikentscher et al. | Oct. 31, 1933 |
| 2,431,294 | Curtis | Dec. 31, 1946 |
| 2,537,142 | Lankford | Jan. 9, 1951 |
| 2,542,827 | Minter | Feb. 20, 1951 |

OTHER REFERENCES

Serial No. 397,138, Fikentscher et al. (A.P.C.), published May 11, 1943.